July 29, 1969  F. G. SULLIVAN ET AL  3,457,624
METHOD OF ASSEMBLING AND TUNING VIBRATION DAMPENERS
Filed Sept. 7, 1966  3 Sheets-Sheet 1

INVENTORS
FRANCIS G. SULLIVAN
CHARLES G. PHELPS
WILLIAM J. TROYER
BY Beaman & Beaman
ATTORNEYS

INVENTORS
FRANCIS G. SULLIVAN
CHARLES G. PHELPS
WILLIAM J. TROYER

United States Patent Office 3,457,624
Patented July 29, 1969

3,457,624
METHOD OF ASSEMBLING AND TUNING VIBRATION DAMPENERS
Francis G. Sullivan, Coldwater, Charles G. Phelps, Litchfield, and William J. Troyer, Coldwater, Mich., assignors to Simpson Manufacturing Company, Litchfield, Mich., a corporation of Michigan
Filed Sept. 7, 1966, Ser. No. 577,702
Int. Cl. B23p *19/04*
U.S. Cl. 29—407                                          3 Claims

ABSTRACT OF THE DISCLOSURE

A method of assembling and tuning vibration dampeners employed to dampen rotary vibrations wherein a resilient vibration dampening element of an annular configuration is interposed between hub and inertia members an axial distance to produce a predetermined vibration dampening characteristic, the accurate tuning and regulation of the vibration dampening characteristics being regulated by the axial length of the vibration dampening element.

---

Figure 1:
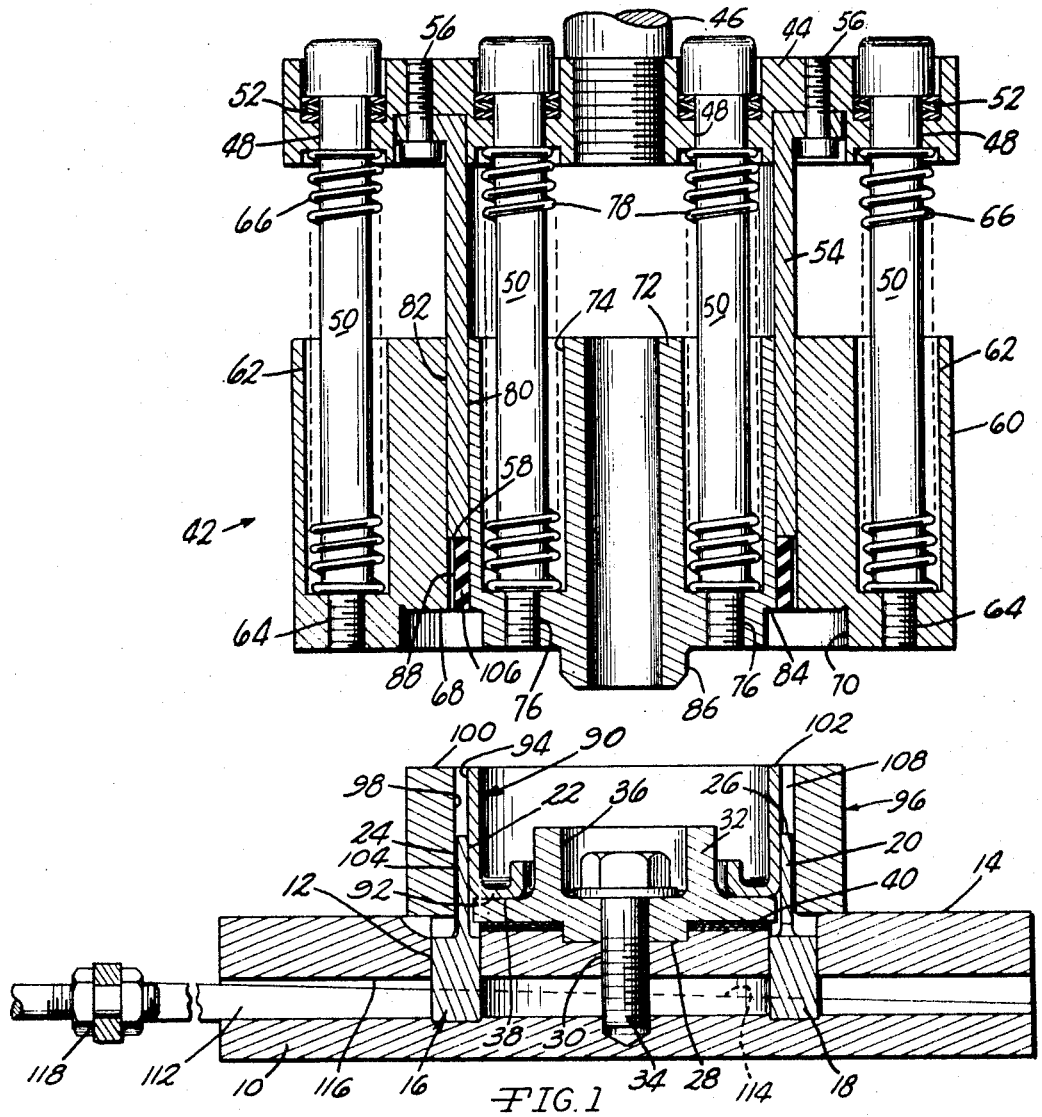

Rotary vibration dampeners such as those used to dampen vibrations occurring in rotating shafts and drive linkages serve to dampen vibrations occurring in the associated rotary member. Such dampeners find wide usage in the automotive arts and are commonly employed with engine crankshafts and drive shafts. Rotary vibration dampeners of the type with which the invention is concerned commonly include a hub member, an inertia member and a resilient vibration-absorbing member. The hub member is normally concentrically mounted on the shaft or element to be dampened and includes a peripheral, cylindrical, concentric surface. The inertia member is usually of an annular configuration having an inwardly facing, cylindrical surface adapted to be axially aligned with the hub member cylindrical surface and radially spaced therefrom. The resilient vibration dampener member normally has an annular form, when installed in the dampener, and may initially be formed as a ring or as a strip formed into an annular configuration. The normal radial thickness of the resilient vibration-dampening element is greater than the radial spacing between the hub and inertia member cylindrical surfaces. The resilient member is forced between the hub and inertia member cylindrical surfaces and is maintained in a compressed state by these surfaces. The frictional engagement between the resilient element and the cylindrical surfaces maintaines the assembly of the three components of the dampener. Vibration dampeners utilizing the aforementioned concepts are found in United States Patent Nos. 2,795,036 and 3,088,-332.

Rotary vibration dampeners are designed to dampen frequencies occurring within given ranges. As each engine or rotating shaft has vibrations occurring therein which fall between specified ranges, the associated vibration dampener is so designed as to dampen those vibrations which occur within the associated rotating component. When designing a rotating vibration dampener to dampen vibrations within a given range the designer attempts to impart specific vibration-dampening characteristics to the dampener by corelating the hub and inertia member weights and configurations, the diameters of the cylindrical surfaces of the hub and inertia members, the radial spacings therebetween, the radial dimension of the elastic member, and the physical characteristics of the elastomer member. With a combination of formulas and calculations, and trial and error methods, the designer is able to produce a vibration dampener which will dampen vibrations occurring within a specified range of relatively wide limits.

While the weight and dimensions of the hub and inertia members can be relatively accurately controlled, manufacturing tolerances necessarily permit variations in the diameter of the hub and inertia surfaces of several thousandths of an inch. Likewise, the normal radial thickness of the resilient vibration dampening element is difficult to accurately control, and the resiliently characteristics and vibration-dampening characteristics, due to the density of the elastic material, age and other physical properties, will cause variations to occur in elastic vibration-dampening members which, supposedly, meet identical specifications.

The object of the invention is to provide a method of assembling and tuning vibration dampeners wherein the frequencies of the vibrations to be dampened by a given dampener may be very accurately regulated.

Another object of the invention is to provide a method of assembling and tuning a vibration dampener wherein the dampener includes radially spaced hub and inertia members maintained in assembly by a resilient vibration-dampening member under compression, and wherein the tuning characteristics of the vibration dampener are regulated by the amount of resilient material interposed between the hub and inertia members.

A further object of the invention is to provide a method of assembling and tuning vibration dampeners wherein the range of frequencies dampenable by a given dampener utilizing hub and inertia members maintained in assembly by a compressed resilient member is determined by the amount of resilient material under compression.

A further object of the invention is to provide a method of assembling and tuning vibration dampeners to produce accurate, consistent, vibration-dampening characteristics between successively assembled dampeners wherein the components of the dampeners are manufactured in lots or batches and assembled in accordance with predetermined testing of an assembled dampener utilizing the components of the predetermined lots.

Figure 6:
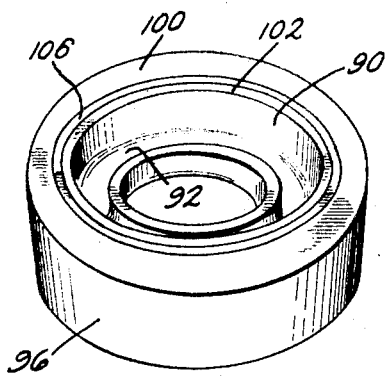
Figure 2:
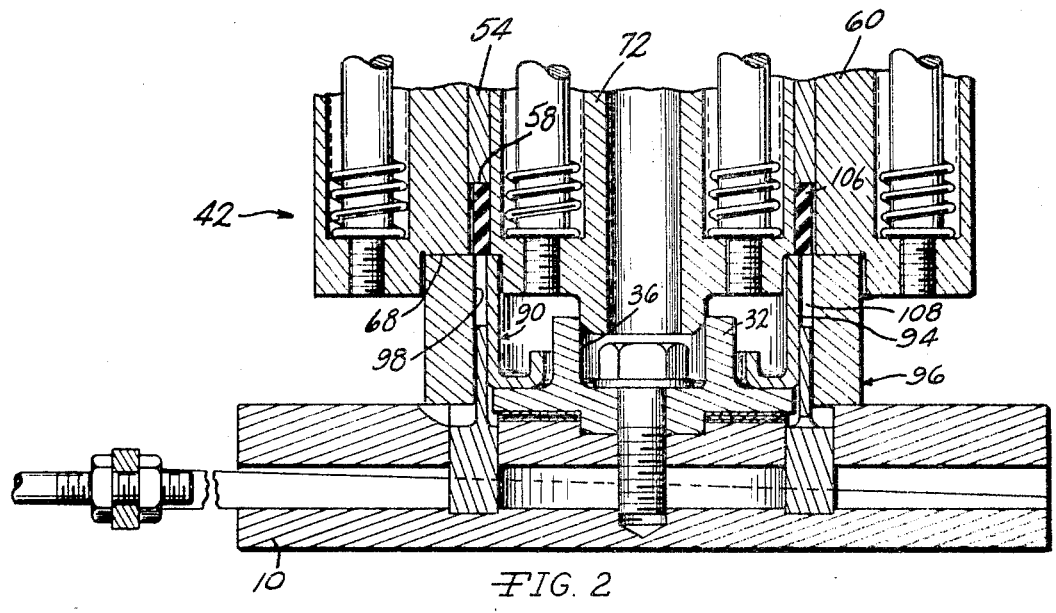
Figure 3:
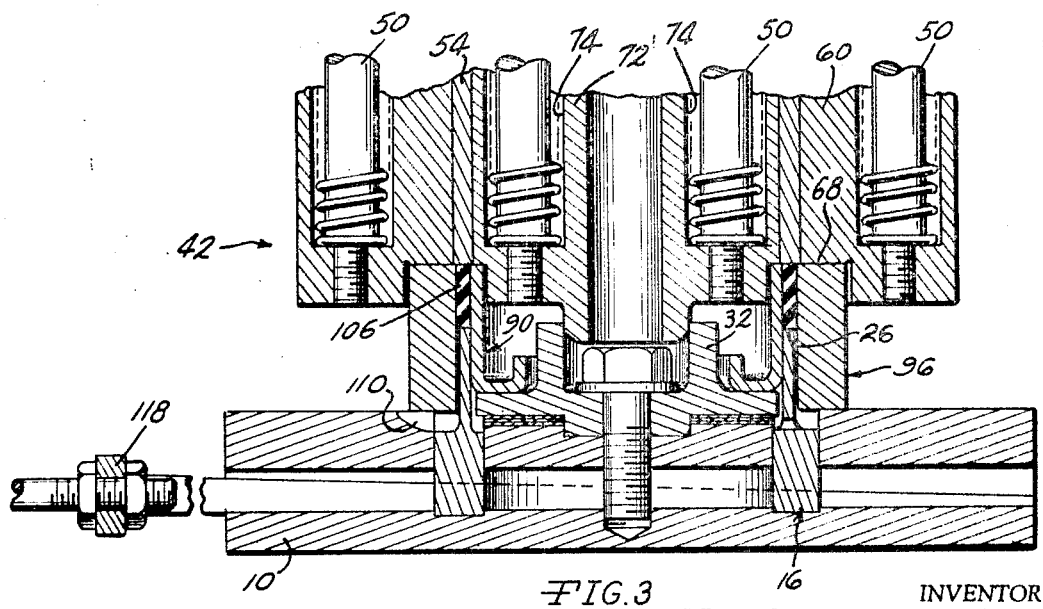
Figure 4:
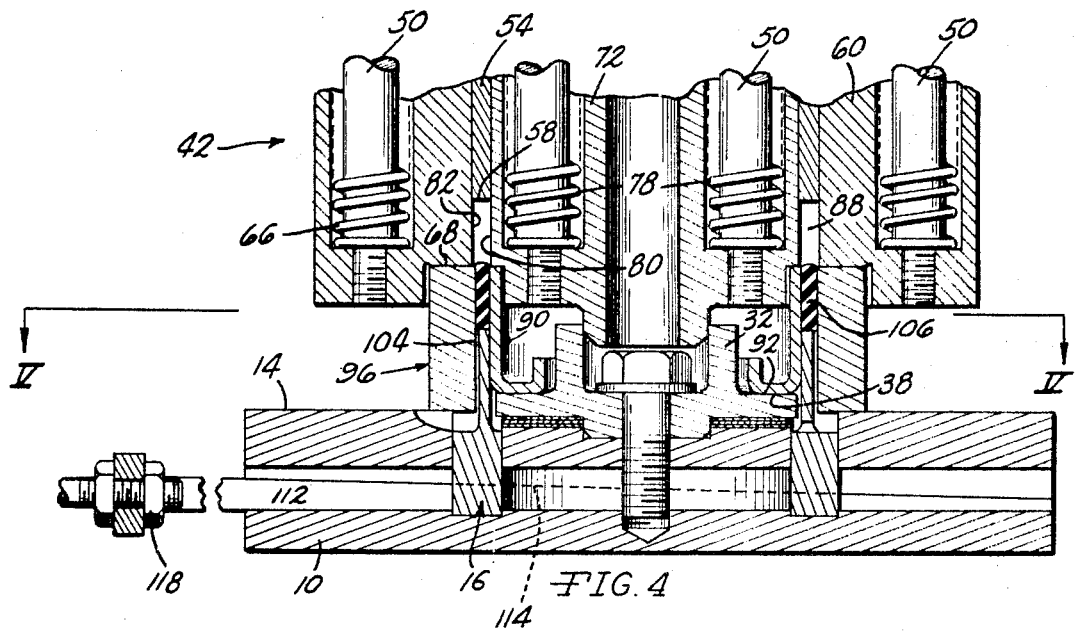
Figure 5:
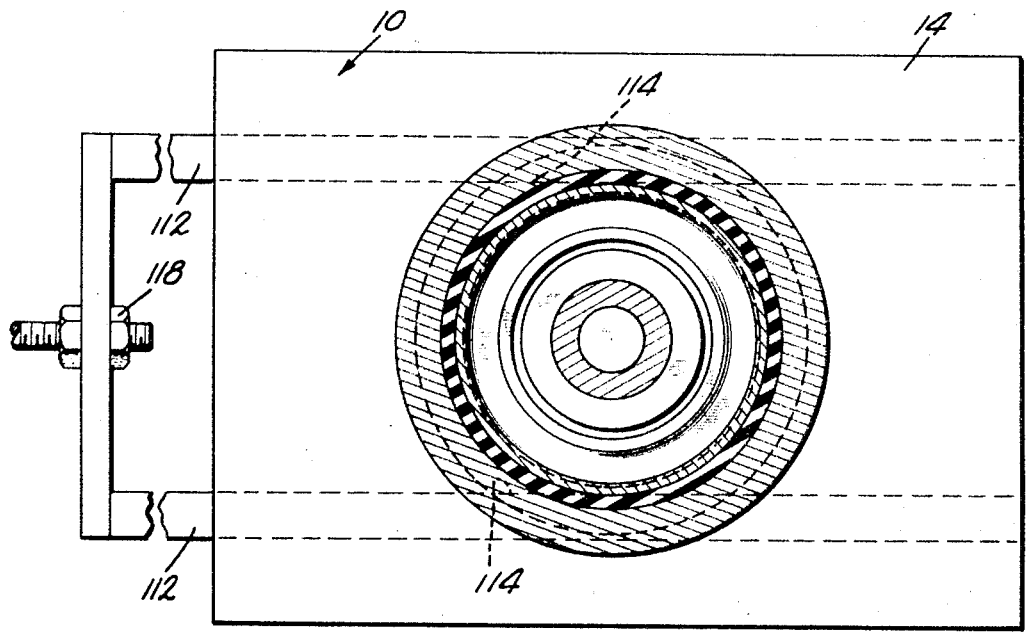

These and other objects of the invention arising from the details and relationships of the components of an embodiment thereof will be apparent from the following description and accompanying drawings wherein:

FIG. 1 is a diametrical, elevational, section view of assembly mechanism which may be utilized in the practice of the method of the invention, illustrating the components in the full "open" or loading position, FIG. 2 is an elevational, diametrical, sectional, detail view illustrating the inner and outer guides oriented to the hub and inertia members and prior to insertion of the resilient member between the vibration dampener components, FIG. 3 is a view similar to FIG. 2, illustrating the relationship of the components of the assembling apparatus at the end of the stroke of the punch, FIG. 4 is an elevational, sectional view similar to FIGS. 2 and 3, illustrating the position of the resilient vibration-dampening element after being installed between the hub and inertia members after the punch has been withdrawn and prior to the inner and outer guides being removed from the vibration dampener, FIG. 5 is a plan, sectional view taken along section V—V of FIG. 4, illustrating the relationship of the back-up ring adjustment means relative to the backup ring, and FIG. 6 is a perspective view of a vibration dampener constructed in accord with the practice of the invention.

The apparatus used to assemble a vibration dampener in accord with the invention and used to practice the method of tuning a vibration dampener in accord with the invention is shown in FIG. 1. It will be appreciated that the apparatus illustrated in the drawings is only illustrative of apparatus capable of practicing the method of the invention.

A base plate 10 of rectangular configuration is provided with an annular recess 12 which extends approximately three-quarters the depth of the base plate from the upper surface 14 thereof. The annular recess 12 receives an annular backup ring 16 including an enlarged lower portion 18 adapted to be closely, slideably received in the recess 12 for adjustable movement in a vertical direction. The upper portion 20 of the backup ring 16 is of a reduced radial dimension and includes an inner, cylindrical surface 22, an outer, cylindrical surface 24, and an annular terminating end 26.

The base plate 10 is centrally recessed at 28 and provided with a threaded hole 30. A locating spindle 32 is mounted on the base plate having a projection received within the recess 28, and a bolt 34 affixes the locating spindle 32 on the base plate. The spindle 32 includes an annular, upstanding projection having an inner, cylindrical surface 36, and also includes a horizontally disposed locating surface 38. The vertical positioning of the spindle 32 with respect to the base plate 10 can be varied by a plurality of shims 40 which may be inserted between the spindle and base plate, as will be apparent from the drawing.

The assembly head, generally indicated at 42, includes a carrier member 44 of a circular configuration which serves as the support for the inner and outer guides and the punch for inserting the resilient vibration-dampening element into place. The carrier 44 is supported upon the piston 46, or equivalent structure, of an expansible motor as to be raised and lowered relative to the base plate 10. The carrier is formed with a plurality of axially extending holes 48 adapted to receive shoulder bolts 50. Shims 52 may be inserted under the heads of the bolts 50 to position the shoulder bolts with respect to the carrier.

An annular punch 54 is concentrically mounted to the underside of the carrier 44 by bolts 56. The punch is of a cylindrical configuration having a substantially uniform wall thickness and terminates in a lower, annular end 58.

The outer guide 60 is of a circular configuration including elongated recesses 62 and threaded holes 64 concentrically located with respect to each recess. The bolts 50 are received within the recesses 62 and the lower ends of the bolts are threaded and screws into holes 64. A compression spring 66 circumscribes each bolt 50 and bears on the carrier and outer guide to bias these components away from each other. The outer guide 60 is provided with a horizontal locating surface 68 and a vertically extending, cylindrical surface 70.

An inner guide 72 is disposed within the outer guide 60 and the punch 54. The inner guide includes elongated, axially extending recesses 74 for receiving the inner shoulder bolts 50, and the threaded ends of the shoulder bolts are received within the threaded holes 76 defined within the inner guide. Compression springs 78 circumscribing the bolts 50 bias the inner guide away from the carrier 44. It will be appreciated that both the outer guide 60 and the inner guide 72 are limited in their movement away from the carrier 44, under the influence of the springs 66 and 78, by the engagement of the bolt heads with the shims 52.

The inner guide 72 is provided with an outer, cylindrical surface 80 which is in a radially opposed and spaced relationship to the outer guide cylindrical surface 82. The inner guide is also provided with a horizontal locating surface 84 and includes a cylindrical locating surface 86 adapted to be received within the cylindrical surface 36 of the spindle 32. The punch 54 is slideably received within the annular space defined by the outer guide surface 82 and the inner guide surface 80, and the punch end 58 terminates above the locating surfaces 68 and 84 to define an annular space 88.

The operation of the aforedescribed apparatus to practice the method of the invention is as follows:

The piston rod 46 will be in the retracted position to maintain the assembly head 42 above the base plate 10 in a relationship as shown in FIG. 1. Thus, the operator has access to the base plate and places the vibration dampener hub member 90 on the spindle 32 within the annular backup ring portion 20. The hub member 90 includes a radially extending portion 92 which directly rests on the spindle locating surface 38, and the peripheral, cylindrical surface 94 of the hub member closely engages the backup ring portion 20, wherein the portion 20 accurately centers the hub member on the locating spindle.

After the hub member 90 has been located on the spindle, the operator will position the annular inertia member 96 on the base plate surface 14. The inertia member 96 may consist of an annular ring having an inner, cylindrical surface 98 and an outer, cylindrical surface. The lower edge of the inertia member rests directly on the surface 14 of the base plate and the upper end 100 will be in alignment with the end 102 of the hub member. The cylindrical surface 98 of the inertia member will closely engage the outer, cylindrical surface 24 of the backup ring portion 20. The backup ring portion 20 is provided with a plurality of axially extending grooves 104 adjacent the inertia member 96 to permit the air to escape from between the hub and inertia members as the resilient vibration-dampening element is inserted.

After the hub and inertia members are properly located on the base plate and locating spindle, the resilient vibration-dampening member 106 is inserted into the space 88 defined in the assembly head. The vibration dampening element 106 consists of either a strip of rubber or rubber-like material, or may be in the form of an annular ring which is placed within the space 88. The components will now be as shown in FIG. 1.

After properly positioning the vibration dampener components on the assembly apparatus, the assembly head 42 is lowered by actuation of the expansible motor associated with the piston rod 46. The assembly head is lowered to that point shown in FIG. 2 wherein the locating surface 68 of the outer guide engages the end 100 of the inertia member, the locating surface 84 of the inner guide engages the end 102 of the hub member, and the cylindrical surface 86 is received within the cylindrical bore 36 of the locating spindle. At this time the lower end of the elastic vibration-dampening element 106 will be substantially in alignment with the edges 100 and 102, but will have not begun to be inserted into the annular space 108 defined between the hub surface 94 and the inertia member surface 98.

Further lowering of the piston rod 46 causes the punch 54 to slide relative to the inner and outer guides and axially force the member 106 into the space 108. As the normal radial thickness of the member 106 is greater than the radial thickness of the space 108, the member will be somewhat elongtaed in the axial direction and movement of the resilient member into the space 108 continues until the lower edge of the member directly engages the upper end 26 of the backup ring. As the member 106 is being inserted into the space 108, the air within the space will be removed through the grooves 104 and communicating passages 110 defined in the base plate. Once the member 106 "bottoms" on the backup ring, further movement of the punch 54 is prevented due to the incompressible nature of the material of the member. Assuming the axial length of the member 106 to substantially correspond with the edges 100 and 102 when the member engages the backup ring edge 26, the components will be as shown in FIG. 3.

The carrier 44 may then be raised to the position of FIG. 4. The frictional engagement of the resilient member 106 with the hub surface 94 and the inertia member surface 98 maintains the assembly of the vibration dampener components and, upon the assembly head 42 being raised to the position of FIG. 1, the vibration dampener may be removed from the apparatus and will maintain the assembly shown in FIG. 6.

The axial position of the backup ring 16 relative to the base plate 10 is determined by a pair of wedges 112 cooperating with complementarily shaped recesses 114 defined in the lower portion 18 of the ring. The wedges 112 are adapted to be slideably received within passages 116 defined in the base plate and a threaded nut and screw adjustment 118, associtaed with the wedges, determines the axial relationship between the wedges and the ring 16. Thus, upon adjustment of the nuts 118, the wedges 112 may be longitudinally moved back and forth within the base plate to raise or lower the backup ring relative to the base plate. In this manner, the position of the backup ring edge 26 may be very accurately determined relative to the base plate surface 14 and the spindle locating surface 38

As the vibration frequency which a given vibration dampening member can effectively dampen is affected by the amount of resilient material inserted between the hub and inertia members, the regulation of the position of the backup ring 16 is able to determine the amount of resilient element material located between the hub and inertia members and, thus, regulate the "tuning" of the vibration dampener. It will be appreciated that the dimensions of the member 106 will be great enough in the axial direction to insure that enough resilient material is available to achieve the desired frequency dampening characteristics.

In actual production, the inertia and hub members are normally formed in "batches" or lots wherein the dimensions of the components will be substantially identical in each lot. Likewise, the resilient members 106 are formed in batches or lots from a common spool or sheet of resilient metarial which has been manufactured in a batch and, thus, insures uniform physical characteristics.

In order to obtain uniform frequency vibration-dampening characteristics for a given lot of vibration dampeners, the hub members of a given lot, the inertia members of a given lot, and the resilient vibration-dampening elements of a given lot will be assembled together. In order to very accurately determine the vibration-dampening characteristics of vibration dampeners assembled from predetermined lots, the first vibration dampener of the lot will be assembled with the backup ring located at the position which is estimated will produce approximately the desired range of vibration-dampening characteristics. After the vibration dampener is assembled, the initial vibration dampener is placed upon a vibration testing machine and checked. The backup ring 16 is then raised or lowered as is necessary to produce the proper range of vibration dampening. If necessary, the next vibration dampener assembled is also checked to insure that the backup ring has been adjusted to provide the desired tuning characteristics. Thereupon, all the remaining inertia, hub and resilient members of the given batches are assembled and, due to the uniform characteristics of the components of a given batch, uniform vibration-dampening characteristics of the subsequently assembled vibration dampeners will be achieved.

With the practice of the invention, it is possible to very accurately "tune" a vibration dampener of the disclosed type and, in those applications wherein the vibration-dampening range is to be very closely regulated, the practice of the invention is invaluable.

It is appreciated that various modifications to the invention may be apparent to those skilled in the art without departing from the spirit and scope thereof, and it is intended that the invention be defined only by the following claims.

We claim:

1. The method of assembling rotatable vibration dampeners to produce predetermined and consistent vibration-dampening characteristics in consecutively assembled dampeners wherein the vibration dampeners each consist of an annular inertia member and a hub member having radially spaced, opposed, axially aligned and extending cylindrical surfaces and an annular elastic vibration-absorbing member maintained in a state of compression between said surfaces by said surfaces and wherein inertia members, hub members and elastic vibration-absorbing members are each individually preformed in lots, the common members of a given lot having substantially identical dimensional and physical characteristics, comprising the steps of coaxially aligning a hub member from a given lot within the inertia member of a given lot whereby the cylindrical surfaces thereof are disposed in an opposed, radially spaced, axially aligned relationship defining an annular, axially extending, cylindrical cavity, axially inserting an annular elastic vibration-absorbing member from a given lot having a normal radial thickness greater than the radial dimension of said cavity into said cavity, frequency testing the assembled vibration dampener to determine the axial depth the elastic member should be inserted into said cavity to provide predetermined vibration dampener characteristics and thereafter assembling hub, inertia and vibration-absorbing members from said given lots in the aforedescribed manner wherein the axial insertion of said vibration-absorbing members into the cavities defined by coaxially aligned hub and inertia members is limited to the depth determined from said tested vibration dampener to impart to the thereafter assembled vibration dampeners the desired predetermined vibration-dampening characteristics.

2. The method of tuning and assembling a rotatable vibration dampener to produce predetermined vibration-dampening characteristics wherein the vibration dampener consists of an annular inertia member and a hub member having radially spaced, opposed, axially aligned and extending cylindrical surfaces and an annular elastic vibration-absorbing member maintained in a state of compression between said surfaces by said surfaces comprising the steps of coaxially aligning the hub member within the inertia member whereby the cylindrical surfaces thereof are disposed in an opposed, radially spaced, axially aligned relationship defining an annular, axially extending, cylindrical cavity, axially inserting an annular elastic vibration-absorbing member having a normal radial thickness greater than the radial dimension of said cavity into said cavity and limiting the axial insertion of said elastic vibration-absorbing member into said cavity upon sufficient elastic material of said vibration-absorbing member being received within said cavity to impart to the assembled vibration dampener the desired predetermined vibration-dampening characteristics whereby the dampener is tuned by the amount of the vibration-absorbing member received within said cavity.

3. The method of regulating said determining the vibration-dampening characteristics of a rotatable vibration dampener consisting of an annular inertia member and a hub member having radially spaced, opposed, axially aligned and extending surfaces and an elastic vibration-absorbing member maintained in a state of compression between said surfaces by said surfaces comprising the steps of coaxially aligning the hub member within the inertia member whereby the surfaces thereof are disposed in an opposed, radially spaced, axially aligned relationship defining an axially extending cavity, determining the axial length of vibration-absorbing member needed to provide the desired vibration dampening charactistics, and inserting an elastic vibration-absorbing member having a normal radial thickness greater than the radial dimension of said cavity into said cavity a predetermined axial distance less than the axial length of said cavity which imparts to the assembled vibration dampener predetermined vibration-dampening characteristics whereby the dampener is tuned by the amount of the vibration-absorbing member received within said cavity.

References Cited

UNITED STATES PATENTS

| | | | |
|---|---|---|---|
| 2,446,621 | 8/1948 | Thiry | 29—407 |
| 2,714,759 | 8/1955 | Von Wagenheim | 29—407 X |
| 2,763,055 | 9/1956 | Hardy | 29—149.5 |
| 2,977,819 | 4/1961 | Haushalter | 74—574 |
| 3,127,673 | 4/1964 | Count | 29—450 |

THOMAS H. EAGER, Primary Examiner

U.S. Cl. X.R.

29—450; 74—574